(12) United States Patent
Sia

(10) Patent No.: US 9,347,791 B2
(45) Date of Patent: May 24, 2016

(54) METHODS AND SYSTEMS FOR OPERATING A TOUCH SCREEN DISPLAY

(75) Inventor: Salvatore Sia, Marina di Carrara (IT)

(73) Assignee: The Boeing Company, Chicago, IL (US)

( * ) Notice: Subject to any disclaimer, the term of this patent is extended or adjusted under 35 U.S.C. 154(b) by 692 days.

(21) Appl. No.: 13/269,146

(22) Filed: Oct. 7, 2011

(65) Prior Publication Data

US 2013/0088435 A1    Apr. 11, 2013

(51) Int. Cl.
G06F 3/041 (2006.01)
G01C 23/00 (2006.01)
G01C 21/36 (2006.01)

(52) U.S. Cl.
CPC ............ *G01C 23/00* (2013.01); *G01C 21/3664* (2013.01)

(58) Field of Classification Search
CPC .. G01C 23/00; G01C 21/3664; G01C 21/367; G06F 2203/04806; G06F 3/0481; G06F 3/04815; G06F 3/04847; G06F 3/04845
See application file for complete search history.

(56) References Cited

U.S. PATENT DOCUMENTS

| | | | |
|---|---|---|---|
| 5,339,391 A * | 8/1994 | Wroblewski et al. | 345/607 |
| 5,638,523 A * | 6/1997 | Mullet et al. | 715/855 |
| 5,864,337 A * | 1/1999 | Marvin | 715/708 |
| 6,181,302 B1 | 1/2001 | Lynde | |
| 6,285,347 B1 * | 9/2001 | Watanabe et al. | 345/684 |
| 6,321,158 B1 * | 11/2001 | DeLorme et al. | 701/426 |
| 6,392,661 B1 * | 5/2002 | Tankersley | 345/660 |
| 6,415,227 B1 | 7/2002 | Lin | |
| 6,747,680 B1 * | 6/2004 | Igarashi et al. | 715/784 |
| 6,865,476 B1 | 3/2005 | Jokerst et al. | |
| 7,268,703 B1 | 9/2007 | Kabel et al. | |
| 7,369,102 B2 | 5/2008 | Luke et al. | |
| 7,430,461 B1 | 9/2008 | Michaels | |
| 7,511,736 B2 | 3/2009 | Benton | |
| 7,793,230 B2 | 9/2010 | Burns et al. | |
| 2005/0248574 A1 * | 11/2005 | Ashtekar | G06T 13/40 345/473 |
| 2005/0270311 A1 * | 12/2005 | Rasmussen et al. | 345/677 |
| 2006/0026535 A1 | 2/2006 | Hotelling et al. | |
| 2007/0070090 A1 * | 3/2007 | Debettencourt et al. | 345/672 |
| 2008/0027637 A1 * | 1/2008 | Sakano | G01C 21/367 701/533 |

(Continued)

FOREIGN PATENT DOCUMENTS

EP    2226712 A1    9/2010
JP    2002310677 A    10/2002

(Continued)

OTHER PUBLICATIONS

U.S. Appl. No. 12/968,918 entitled "Methods and Systems for Augmented Navigation", filed Dec. 15, 2010.

(Continued)

*Primary Examiner* — Amare Mengistu
*Assistant Examiner* — Crystal A Mathews
(74) *Attorney, Agent, or Firm* — Armstrong Teasdale LLP

(57) ABSTRACT

A method for operating a touch screen display for a cartographic device is described. The method includes sensing a touch on the touch screen display of the cartographic device, the cartographic device operable to display a map, causing at least one toolbar to be displayed at an edge of the touch screen display in response to the sensed touch, sensing a finger movement along one of the displayed toolbars on the touch screen display, and changing a configuration of the displayed map based on the sensed finger movement.

23 Claims, 6 Drawing Sheets

(56) References Cited

U.S. PATENT DOCUMENTS

| | | |
|---|---|---|
| 2008/0141129 A1 | 6/2008 | Oozawa et al. |
| 2008/0162031 A1* | 7/2008 | Okuyama ............ G01C 21/367 701/532 |
| 2008/0165255 A1* | 7/2008 | Christie et al. ........... 348/207.99 |
| 2009/0024314 A1* | 1/2009 | Kim .............................. 701/200 |
| 2009/0171580 A1 | 7/2009 | Nezu |
| 2009/0228820 A1 | 9/2009 | Kim et al. |
| 2010/0162150 A1* | 6/2010 | O'Mullan et al. ............ 715/764 |
| 2010/0194784 A1 | 8/2010 | Hoff et al. |
| 2010/0208122 A1* | 8/2010 | Yumiki ................. G02B 7/021 348/333.08 |
| 2011/0054770 A1* | 3/2011 | Allen et al. .................... 701/200 |
| 2011/0063248 A1* | 3/2011 | Yoon ............................ 345/174 |
| 2011/0160996 A1* | 6/2011 | Terai ................. G01C 21/3423 701/532 |
| 2011/0161864 A1* | 6/2011 | Nagasaka ............ G01C 21/367 715/784 |
| 2011/0166777 A1 | 7/2011 | Chavakula |
| 2011/0242136 A1* | 10/2011 | Yamada et al. ............... 345/660 |
| 2012/0158287 A1* | 6/2012 | Altamura et al. ............. 701/412 |
| 2012/0200603 A1* | 8/2012 | Backer et al. ................. 345/650 |
| 2013/0086517 A1* | 4/2013 | Van Lancker et al. ........ 715/800 |
| 2013/0096819 A1* | 4/2013 | Tarnok ......................... 701/428 |

FOREIGN PATENT DOCUMENTS

| | | |
|---|---|---|
| JP | 2007192881 A | 8/2007 |
| JP | 2010127678 A | 6/2010 |

OTHER PUBLICATIONS

Extended European Search Report of Application No. 12187230.3; Feb. 18, 2015; 6 pages.

* cited by examiner

METHODS AND SYSTEMS FOR OPERATING A TOUCH SCREEN DISPLAY

BACKGROUND

The field of the disclosure relates generally to aircraft cockpit displays and more particularly, to methods and systems for operating a touch screen display.

At least some known aircraft include cockpit displays use charts and other information displays that aid in navigation and situational awareness. For example, charts displayed on electronic displays, referred to herein as electronic charts, typically are used for a wide variety of aspects of flight and flight planning. Certain of these charts, and for that matter other cockpit displays, are configured as touch screen display. Such charts may also be incorporated in a device commonly referred to as an electronic flight bag. For the purposes herein, an electronic flight bag is a portable device having a display, possibly a touch screen display, through which a user can access flight charts and other aircraft related information displays. An electronic flight bag may incorporate an interface that allows it to be communicatively coupled to the cockpit displays.

The advantage of touch screens applied to navigational devices is that a user is able to, for example, use two fingers to zoom in or zoom out on a portion of the cartographic display, in a way similar as mobile phones zoom in and out on a photo. However, such a zooming operation performed on such touch screen devices would be not very precise, and precision is generally desired during aircraft applications.

BRIEF DESCRIPTION

In one aspect, a method for operating a touch screen display for a cartographic device is provided. The method includes sensing a touch on the touch screen display of the cartographic device, the cartographic device operable to display a map, causing at least one toolbar to be displayed at an edge of the touch screen display in response to the sensed touch, sensing a finger movement along one of the displayed toolbars on the touch screen display, and changing a configuration of the displayed map based on the sensed finger movement.

In another aspect, a system is provided that includes a processing device, a memory communicatively coupled to the processing device, and including cartographic data, a display communicatively coupled to the processing device, and a touch screen interface associated with the display and communicatively coupled to the processing device. The touch screen interface is operable to sense a touch thereon and communicate that a touch has occurred to the processing device, and the processing device is operable to cause at least one toolbar to be displayed at an edge of the display in response to the touch. Further, the touch screen interface is operable to sense a finger movement along one of the displayed toolbars and communicate the finger movement to the processing device which is operable to change a configuration of the map displayed on the display, based on the sensed finger movement.

In still another aspect, one or more computer-readable storage media having computer-executable instructions embodied thereon are provided. When executed by at least one processor, the computer-executable instructions cause the at least one processor to receive signals indicating a touch has been sensed on a touch screen display displaying a cartographic map, cause at least one toolbar to be displayed at an edge of the touch screen display in response to the received signals, receive signals indicating a finger movement has been sensed along one of the displayed toolbars, and cause a configuration of the displayed map to be changed based on the sensed finger movement.

The features, functions, and advantages that have been discussed can be achieved independently in various embodiments or may be combined in yet other embodiments, further details of which can be seen with reference to the following description and drawings.

DETAILED DESCRIPTION

The embodiments described herein are directed to a "toolbar" which in the illustrative embodiments are implemented as a set of bars that appear on one or more sides (bottom/top/left/right) of a "touch screen device" when the corresponding bottom/top/left/right of the screen is touched by a user. The toolbar serves a variety of purposes, and is intended to improve the interaction between users and the touch screen devices in relation to navigational needs. In a particular embodiment, described below, the toolbar describes a better way to control pan, zoom, rotation and tilt of a cartographic screen, providing, at the same time, basic navigational information to the user. Other functions are contemplated being added to the disclosed toolbars or deployed as standalone toolbars.

As described herein, methods and systems for operating the touch screen display of navigational devices are provided, which may be present on aircraft cockpits or deployed within boat/ship cockpits. For simplicity of description, examples related to aircraft cockpits are provided, but identical concepts apply also to boat/ship cockpits. For example, appropriate navigational devices for each application (aeronautical or nautical) are available, and operate with similar concepts and addressing similar problems.

In one embodiment, technical effects of the methods, systems, and computer-readable media described herein include at least one of: (a) sensing a touch on the touch screen display of the cartographic device, the cartographic device operable to display a map, (b) causing at least one toolbar to be displayed at an edge of the touch screen display, (c) sensing a finger movement along one of the displayed toolbars, and (d) changing a configuration of the displayed map based on the sensed movement.

Figure 1:
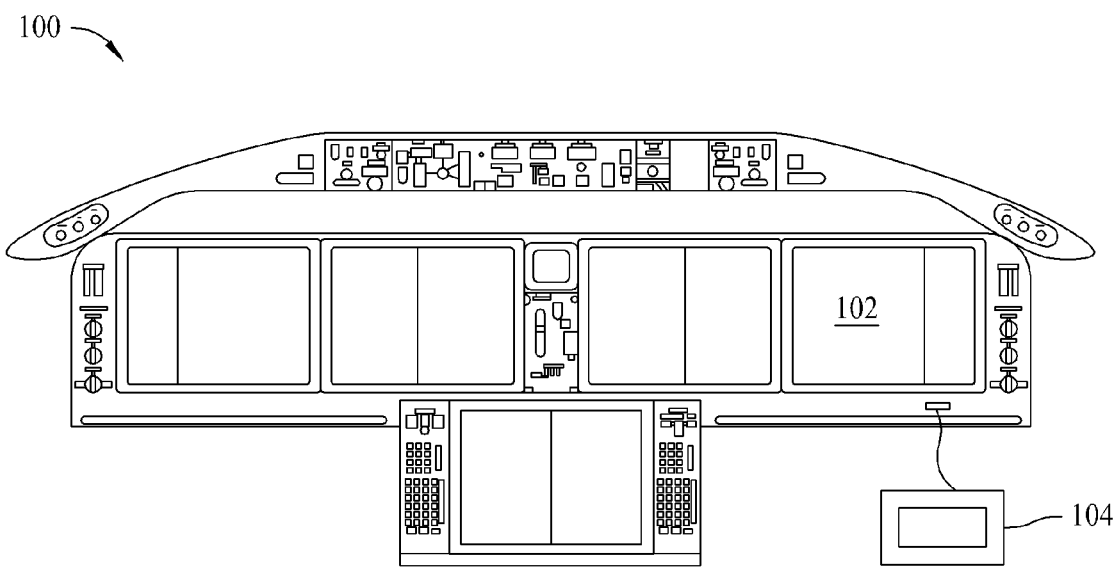
FIG. 1 is a forward perspective view of an exemplary aircraft cockpit display panel that includes at least one display screen and an electronic flight bag in accordance with an illustrative embodiment.

FIG. 1 is a forward perspective view of an exemplary aircraft cockpit display panel 100 that includes at least one display screen 102 in accordance with an illustrative embodiment. In the illustrative embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag 104, which may be embodied as a standalone device such as, but not limited to a PDA, laptop PC, or portable touch screen device, or as a software component of a system executing on a processor that is part of a subsystem of the aircraft.

In the exemplary embodiment, the electronic flight bag 104 includes an electronic storage device configured to store various user-configurable flight-related objects for all required and desired information for a particular flight, such as flight routes, as defined by, for example, way-points, airport information, temporary flight restrictions, and weather information as well as any other user-defined objects associated with a flight, ground operations, and/or flight planning. Certain of these include electronic versions of aviation charts and/or navigation charts, sometimes collectively referred to herein as electronic charts or maps. The electronic flight bag 104 may receive data from various aircraft and ground sensors and systems, determines flight information, for example, position data and heading data, based on the received data in real-time, and displays the flight information and/or alerts the flight crew through display screen 102 and other aural and/or visual indicators positioned on cockpit display panel 100. One or more of the flight systems and the electronic flight bag 104 may correlate position data and heading data with the electronic map data. Such flight information provides the flight crew with additional situational awareness during all phases of aircraft operation. In accordance with the embodiments described herein, the above described examples are considered to incorporate one or more touch screens.

As explained above, the embodiments are directed to a toolbar on a touch screen device that provides an ability to simplify, speed-up and make more precise and comfortable the interaction with the touch screen device. Such toolbars provide a look and feel that is believed to be more appropriate for navigational (aeronautical or nautical) purposes. For example, in some touch screen devices (e.g. mobile phones and mobile computing devices), the zooming operation is performed with two fingers drawing close or moving away from one another. In the described embodiments, and referring to the display 200 of FIG. 2, the above described two finger movement is replaced by one or more precise toolbars 210, 220, 230, which provide or display valuable scale information while a user is setting the scale. In previous systems, scale was set by dedicated buttons or two finger "touch" actions, which are less comfortable and precise in case of navigational purposes.

Figure 2:
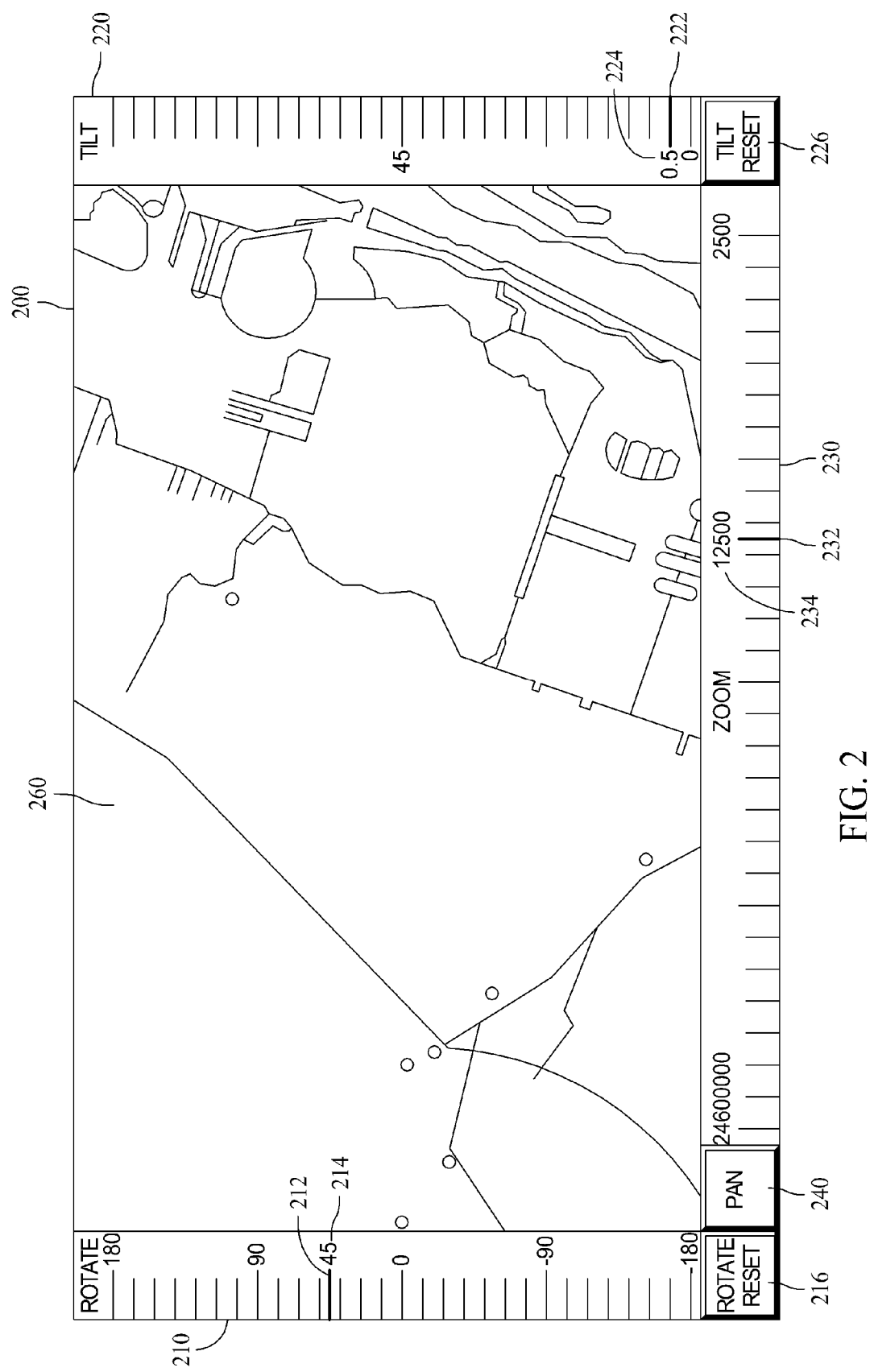
FIG. 2 is a depiction of an aircraft display that incorporates a tool bar according to one embodiment.
Figure 3:
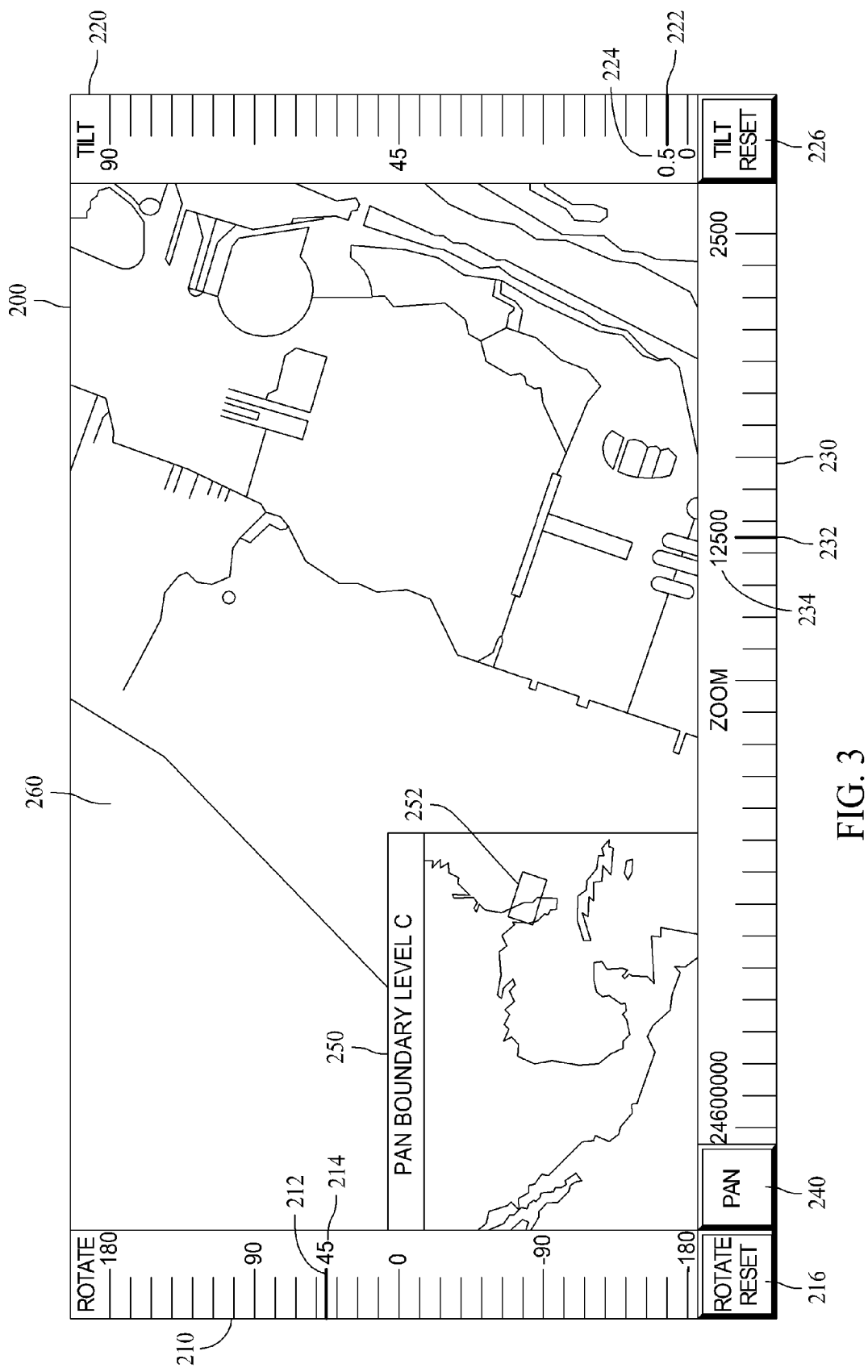
FIG. 3 is a depiction of the display of FIG. 2, further illustrating a pan window.

Specifically in FIG. 2, toolbar 210 is related to rotation, tool bar 220 is related to tilt, and tool bar 230 is related to zoom. A PAN button 240 initiates display of (and removal of) a pop up type screen 250, as shown in FIG. 3, which shows the boundaries of the chart 260 shown on display 200. It should be noted that the toolbars described herein need not be located on the borders on which they are depicted on the display 200, and that in embodiments, the user is able to select on which border a specific tool bar is to appear.

In one embodiment, when a user touches one of the "edges" of the display 200 (e.g., the bottom, top, left, right border of the screen), the toolbars described herein appear (collectively referred to as tool bar 300). In embodiments, the device on which the toolbar 300 appears is such that the toolbar 300 disappears after a few seconds, when no further action is performed with it, or should the user's finger touch the display 200 elsewhere. That toolbar 300 does not permanently use portions of the display is thought to be an advantage that would be considered favorably by users.

Referring to the "zoom tool bar" 230 at the bottom of the display 200, it is, graduated with minimum and maximum scale values for the cartography displayed by the system. Tool bar 230 includes a cursor 232 that signifies the current scale value (e.g., current value). In use, the user "captures" the cursor 232 with their finger and by moving cursor 232 along the tool bar 230, the zoom scale value 234 displayed beside the cursor 232 changes allowing the user to precisely set the wanted scale with immediate feedback about the minimum and maximum scale values, the current setting value and the range still available (how far the cursor 232 can still be moved left and right). In the illustrated embodiment, the toolbar 230 occupies the whole border of the display 200 allowing for comfortable settings because the toolbar 230 is large enough. When the user's finger stops moving and/or releases the cursor 232, the cartographic screen is redrawn accordingly to the scale set, in one embodiment.

As mentioned above, the zoom tool bar 230 can host pan button 240. Pan button 240, when touched, causes pan window 250 to appear somewhere on the display 200. In embodiments, pan window 250 displays a rough contour of the cartographic coverage or cartographic information, e.g., showing boundaries of a displayed map on a lower resolution map, referred to herein as a "navigator window" 252 which is inside the "pan window 250") and sized based on the zoom level. In embodiments, a user is able to move the navigator window 252 to pan inside the coverage highlighted by the pan window 250. Once this navigator window 252 is released (the user removing his finger from the touch screen) in a new position inside the pan window 250 (or during its movement in certain embodiments), the cartographic screen is redrawn accordingly to the new position. In other words, pan window behaves in a way similar to the navigator present in many graphical programs, but is adapted to navigational purposes. Specifically, in addition to the rough cartographic contour, the pan window 250 also displays the cartographic coverage ("boundaries") of the "cartographic levels" available in the system, also allowing a selection of what "boundaries" should be displayed. As used herein, a "cartographic level" is a layer of cartographic data, each level with increased cartographic details. In embodiments described herein, many cartographic levels are included within the described systems. Such a configuration provides: immediate feedback of the portion displayed by cartographic screen; quick navigation somewhere inside the coverage just moving the navigator window; no clutter on the main cartographic screen because no-boundaries are displayed on it, they are just displayed on the "pan window"; the "pan window" and its "boundaries" can be displayed together to the standard/current boundary display (which is on top of the main cartographic screen), if preferred. Once the desired position is reached (or during the movement of the navigator window in certain embodiments), the cartographic screen is redrawn, accordingly to the position set.

Rotation toolbar 210 is depicted on the left border of the display 200 in FIGS. 2 and 3 which in the embodiment illustrated is graduated with minimum and maximum angle values (e.g., 0 to 360 or −180 to +180 degrees). Rotation toolbar 210 includes a cursor 212 which denotes the current rotation angle value. As above, capturing the cursor 212 with the user's finger and moving it along the toolbar 210, the angle value 214 displayed beside the cursor changes. As shown, the toolbar 210 occupies the whole left border of the display 200. At least one advantage is the same as described above for tool bar 230. When the user's finger stops moving and/or releases the cursor 212 (or during its movement in certain embodiments), the cartographic screen shown on the display 200 is redrawn accordingly to the rotation set by the movement of the cursor 212.

A tilt toolbar 220 is shown in FIGS. 2 and 3 as being along the right border of display 200. In the illustrated embodiment, tilt toolbar 220 is graduated with minimum and maximum angle values (e.g., 0 to 90 degrees) and includes a cursor 222 that indicates the current tilt angle value. Again, capturing the cursor 222 with the finger of a user and moving the cursor 222 along the toolbar 220, the angle value 224 displayed beside the cursor 222 changes. Also, the toolbar 220 occupies the whole side border of the display 200. The advantages of this configuration are the same as for the zoom toolbar 230 and the rotation toolbar 210. When the user's finger stops moving and/or releases the cursor 222 (or during its movement in certain embodiments), the cartographic screen shown on the display 200 is redrawn accordingly to the tilt set by the movement of the cursor 222.

In embodiments, if the touch screen is big enough to allow comfortable interaction with such bars, it is possible to accommodate, for example, the rotation toolbar 210 and the tilt toolbar 220 along one border of the touch screen, saving space for other commands that might be implemented in a similar fashion.

The toolbar concept described herein achieves greater accuracy, comfort and speed than existing solutions, when applied to navigational needs. For example, zooming, rotating, and/or tilting with two fingers is acceptable for a photo, but a graduated toolbar provides the increased precision desired in navigation applications. In such navigation applications the goal for the user is not only the final result (e.g. a zoom value) but also the immediate precise feedback, for example, and including the value of the zoom, what level of zoom has been reached in the toolbar and what range of zooming is still available.

The embodiments described herein operate to quickly restore default values. In one embodiment, and as shown in FIGS. 2 and 3, the rotation toolbar 210 incorporates a rotation reset button 216 and the tilt toolbar 220 incorporates a tilt reset button 226. The reset buttons 216 and 226 are portions of the corresponding toolbar 210, 220 that are dedicated to resetting default values (e.g., zero) or default orientation for rotation and tilt angles. In another example, in the case of a zero degree angle, it is sufficient to simply move the finger of the user to the bottom value of the corresponding toolbar. In other embodiments, shortcuts may be applied to toolbar operation. For example, and referring to the rotation toolbar 210 as an example, to set display 200 to a specific degrees of rotation value, the user simply "double clicks" (i.e., touches the same spot on the touch screen twice) close to the appropriate spot on the toolbar 210

By configuring the various toolbars to cover the entire corresponding border of the display, the toolbars are large enough to allow fine tuned settings as exact zooming, e.g., setting in the scale of zoom, into cartography maps is a valuable navigation function. Knowing what is the remaining range for zoom (zoom bar) or knowing the exact position inside the whole coverage (pan window) makes the user interaction more comfortable, giving the user the feeling that they are better able control the device.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 4:
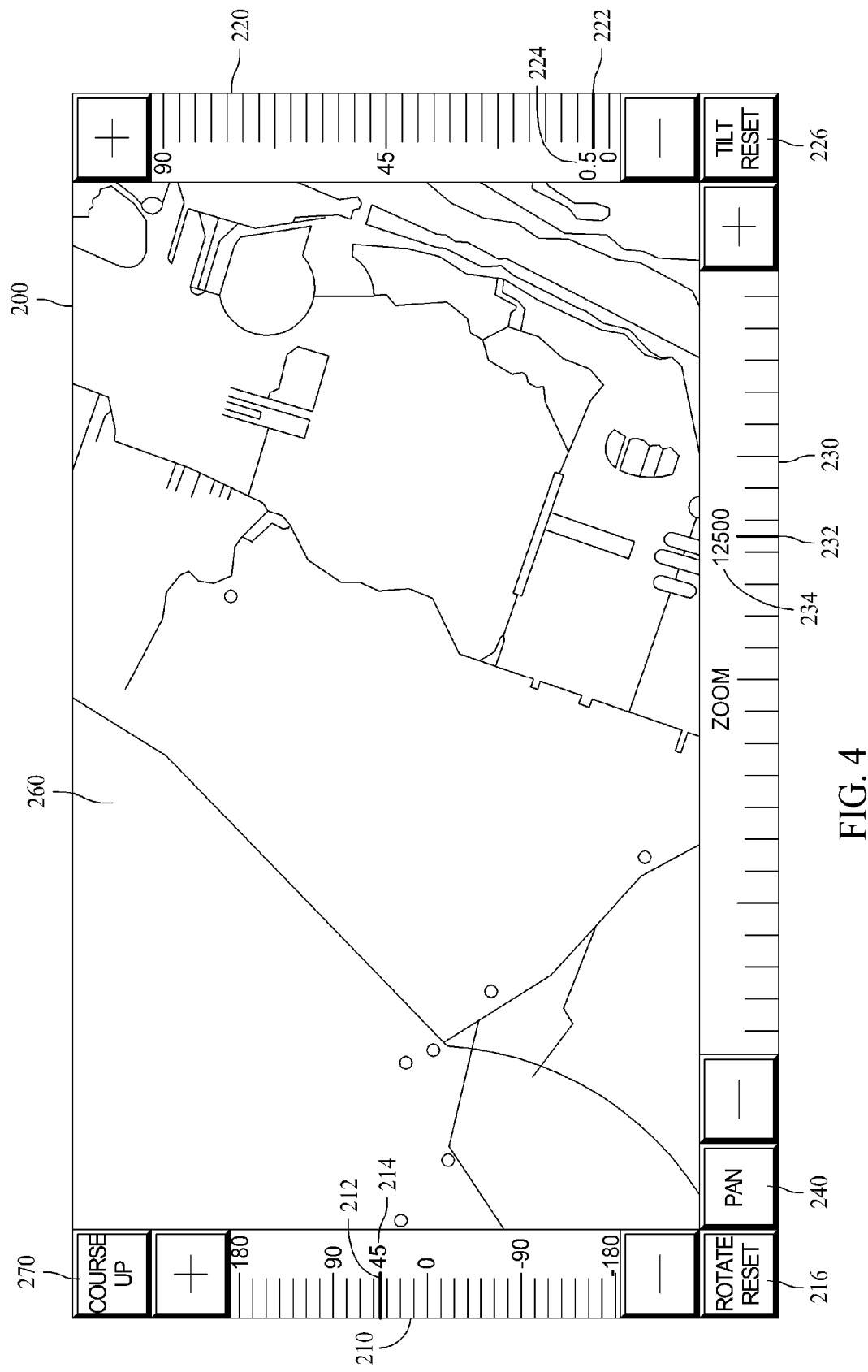
FIG. 4 is a depiction of an aircraft display that incorporates an alternative embodiment of a tool bar according to one embodiment.

Alternative embodiments are shown in FIG. 4 and may include "+" or "−" buttons on one or more of the zoom tool bar 230, rotation bar 210 and tilt bar 220, which operate to respectively to zoom in/out, rotate +/− or tilt +/− the display, for example, by preset values. In another embodiment a "course up" button 270 may be included in the rotation bar 210 that automatically displays the cartographic screen in the "course-up" mode such that the screen is automatically rotated to display the cartography exactly as the reality appears in front of the user.

Figure 5:
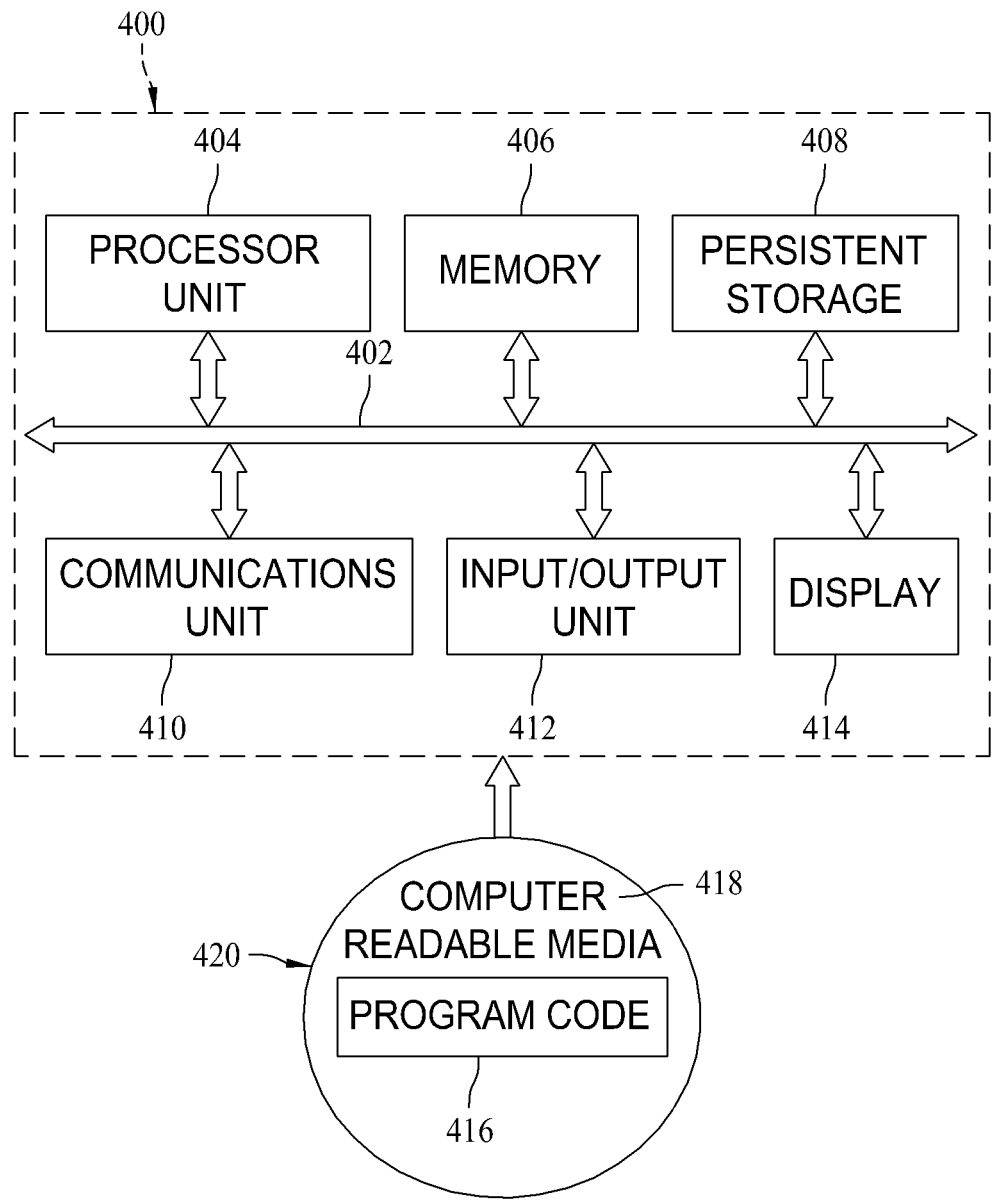
FIG. 5 is a diagram of a data processing system.

Turning now to FIG. 5, a diagram of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414 and is generally representative of one or both of the cockpit display system 102 of FIG. 1 and the electronic flight bag 104 of FIG. 1 either or both of which may be configured to display the embodiments of FIGS. 2 and 3.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, without limitation, a random access memory or any other suitable volatile or non-volatile storage device. Persistent storage 408 may take various forms depending on the particular implementation. For example, without limitation, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, without limitation, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communication links.

Input/output unit 412 allows for input and output of data with other devices that may be connected to data processing system 400. For example, without limitation, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 406 or a cache such as that found in an interface and memory controller hub that may be present in communications fabric 402.

Figure 6:
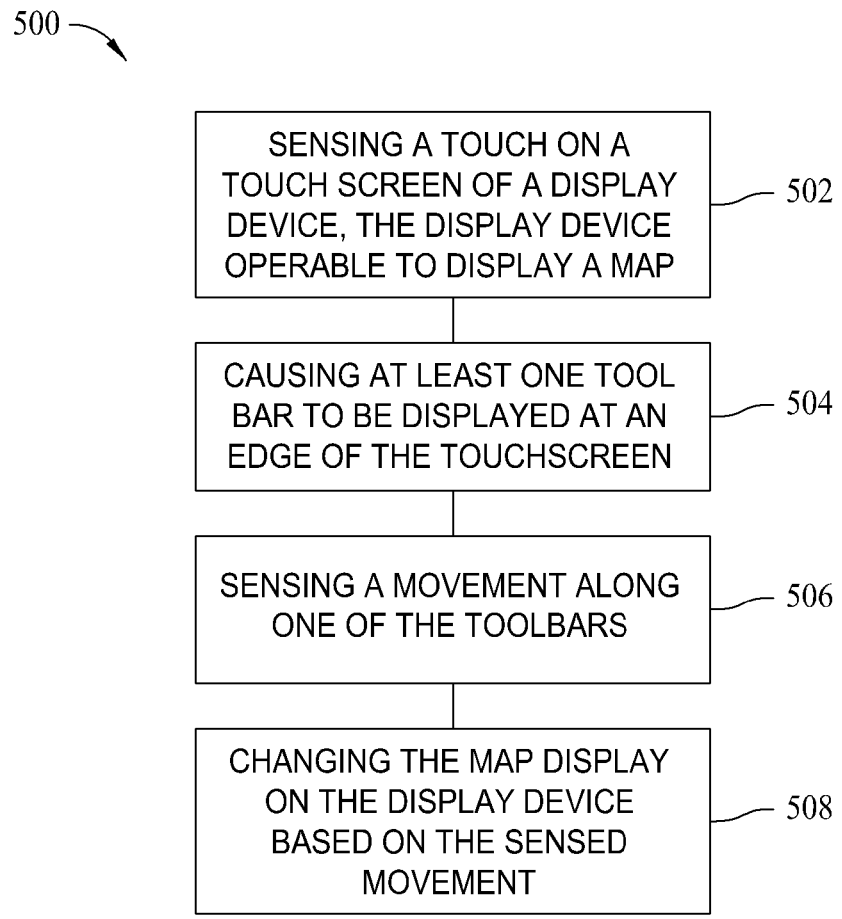
FIG. 6 is a flowchart describing a method for display control using the toolbars described with respect to FIGS. 2 and 3.

As mentioned above, the above described system is operable to provide a method for operating a touch screen display for a cartographic device, as illustrated by flowchart 500 of FIG. 6. The method includes sensing 502 a touch on the touch screen display of the cartographic device, the cartographic device operable to display a map, causing 504 at least one toolbar to be displayed at an edge of the touch screen display, sensing 506 a finger movement along one of the displayed toolbars, and changing 508 a configuration of the displayed map based on the sensed movement. As described herein, the toolbars include at least one of a zoom toolbar, a rotation toolbar and a tilt toolbar which are displayed along one or more edges of the touch screen display. Sensing a finger movement along one of the displayed toolbars includes causing a cursor associated with the corresponding toolbar to move along with the finger, eventually changing one or more of zoom, rotation, and tilt on the displayed map based on the sensed finger movement.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a touch screen display for a cartographic device in an aircraft, said method comprising:
    sensing a touch on an edge of a plurality of edges of the touch screen display of the cartographic device, the cartographic device operable to display a map;
    causing a plurality of toolbars to be displayed, each toolbar displayed along an entire respective edge of the plurality of edges of the touch screen display in response to the sensed touch, wherein each toolbar enables numerical scaling of at least one respective parameter associated with the map between a minimum numerical scale value and a maximum numerical scale value;
    sensing a finger movement along a touched toolbar on the touch screen display;
    displaying the minimum numerical scale value, the maximum numerical scale value, and a current numerical scale value within the touched toolbar;
    changing a configuration of the displayed map based on the sensed finger movement; and removing the plurality of displayed toolbars when the touch is no longer sensed.

2. The method according to claim 1 wherein causing a plurality of toolbars to be displayed comprises causing at least one of a zoom toolbar, a rotation toolbar and a tilt toolbar to be displayed at one or more edges of the touch screen display.

3. The method according to claim 2 wherein sensing a finger movement along one of the touched toolbars comprises causing a cursor associated with the corresponding toolbar to move along with the finger.

4. The method according to claim 3 wherein changing a configuration of the displayed map comprises setting a scale of one or more of zoom, rotation, and tilt on the displayed map based on the sensed finger movement.

5. The method according to claim 1 wherein causing a plurality of toolbars to be displayed comprises providing scale information within at least one toolbar.

6. The method according to claim 1 wherein causing a plurality of toolbars to be displayed comprises configuring a portion of at least one toolbar as a reset button.

7. The method according to claim 6 further comprising:
sensing a touch of the reset button; and
changing at least one of a zoom, rotation, and tilt to a default orientation on the displayed map.

8. The method according to claim 1 wherein causing a plurality of toolbars to be displayed comprises causing each of a zoom toolbar, a rotation toolbar and a tilt toolbar to be displayed on corresponding edges of the touch screen display.

9. The method according to claim 1 wherein causing a plurality of toolbars to be displayed comprises configuring a portion of at least one toolbar as a PAN button.

10. The method according to claim 9 further comprising:
sensing a touch of the PAN button; and
causing a pop up type screen to be displayed on a portion of the touch screen which shows the boundaries of the displayed map on a lower resolution map.

11. The method according to claim 1, wherein sensing a touch on an edge of a plurality of edges of the touch screen display further comprises sensing a touch on an edge of a plurality of edges of at least one of an aircraft cockpit touch screen display and a marine cockpit touch screen display.

12. An aircraft navigation system comprising:
a processing device;
a memory communicatively coupled to said processing device, said memory comprising cartographic data;
a display communicatively coupled to said processing device; and
a touch screen interface associated with said display and communicatively coupled to said processing device, said touch screen interface operable to sense a touch on an edge of a plurality of edges of said touch screen interface and communicate that a touch has occurred to said processing device, said processing device operable to cause a plurality of toolbars to be displayed, each toolbar displayed along an entire respective edge of the plurality of edges of said display in response to the touch, wherein each toolbar enables numerical scaling of at least one respective parameter associated with the map between a minimum numerical scale value and a maximum numerical scale value, said touch screen interface operable to sense a finger movement along a touched toolbar and communicate the finger movement to said processing device, said processing device operable to display the minimum numerical scale value, the maximum numerical scale value, and a current numerical scale value based on the sensed finger movement within the touched toolbar, said processing device operable to change a configuration of a displayed map on said display based on the sensed finger movement, said processing device operable to remove the plurality of displayed toolbars when the touch is no longer sensed.

13. The system according to claim 12 wherein to cause a plurality of toolbars to be displayed at an edge of said display, said processing device is programmed to cause each of a zoom toolbar, a rotation toolbar and a tilt toolbar to be displayed on corresponding edges of said display.

14. The system according to claim 13 wherein said processing device is programmed to cause said display to display a cursor within each of the zoom toolbar, the rotation toolbar and the tilt toolbar, the cursor for each at a current scale setting for cartographic information associated with a corresponding toolbar.

15. The system according to claim 14 wherein, in combination, said processing device, said display, and said touch screen interface are configured to:
move the cursor along the scale of the touched toolbar in response to sensed finger movement within the corresponding touched toolbar; and
set the scale of one of zoom, rotation, and tilt on the displayed map based on the sensed finger movement.

16. The system according to claim 15 wherein said processing device is further configured to cause said display to display a current value of cartographic information associated with the cursor.

17. The system according to claim 13 wherein said processing device is further configured to cause said display to display scale information for each toolbar.

18. The system according to claim 12 wherein to cause a plurality of toolbars to be displayed at an edge of said display, said system is programmed to configure a portion of at least one toolbar as a reset button, said system programmed to, in response to a sensed touch of the reset button, change the corresponding one of zoom, rotation, and tilt to a default orientation on said display.

19. The system according to claim 12 wherein to cause a plurality of toolbars to be displayed at an edge of said display, said system is programmed to configure a portion of at least one toolbar as a PAN button, said system programmed to, in response to a sensed touch of the PAN button, cause a pop up type screen to be displayed on a portion of said display which shows boundaries of the displayed map on a lower resolution map.

20. The system according to claim 12, wherein said display comprises an aircraft cockpit display.

21. The system according to claim 12, wherein said display comprises a marine cockpit display.

22. One or more non-transitory computer-readable storage media having computer-executable instructions embodied thereon, wherein when executed by at least one processor, the computer-executable instructions cause the at least one processor to:
receive signals indicating a touch has been sensed on an edge of a plurality of edges of a touch screen display displaying a cartographic map in an aircraft;
cause a plurality of toolbars to be displayed, each toolbar displayed along an entire edge of the plurality of edges of the touch screen display in response to the received signals, wherein each toolbar enables numerical scaling of at least one parameter associated with the map between a minimum numerical scale value and a maximum numerical scale value;
receive signals indicating a finger movement has been sensed along a touched toolbar;

display the minimum numerical scale value, the maximum numerical scale value, and a current numerical scale value based on the sensed finger movement within the touched toolbar;

cause a configuration of the displayed map to be changed based on the sensed finger movement; and remove the plurality of displayed toolbars when a signal is received indicating that the touch is no longer sensed.

23. One or more non-transitory computer-readable storage media having computer-executable instructions embodied thereon according to claim 19, wherein when executed by at least one processor, the computer-executable instructions cause the at least one processor to:

cause a cursor within the touched toolbar to be moved along a scale associated with the touched toolbar in response to signals indicative of sensed finger movement within the corresponding toolbar; and set the scale for the displayed map based on the sensed finger movement within the corresponding toolbar.

* * * * *